(12) United States Patent
Ng et al.

(10) Patent No.: US 6,791,970 B1
(45) Date of Patent: Sep. 14, 2004

(54) PC-TO-PHONE FOR LEAST COST ROUTING WITH USER PREFERENCES

(75) Inventors: Ede-Phang Ng, Singapore (SG); Wee Sin Tam, Singapore (SG)

(73) Assignee: Mediaring Ltd., Singapore (SG)

( * ) Notice: Subject to any disclaimer, the term of this patent is extended or adjusted under 35 U.S.C. 154(b) by 0 days.

(21) Appl. No.: 09/398,319

(22) Filed: Sep. 16, 1999

Related U.S. Application Data

(60) Provisional application No. 60/119,760, filed on Feb. 11, 1999.

(51) Int. Cl.⁷ ............................................. H04L 12/66
(52) U.S. Cl. ...................................... 370/352; 370/401
(58) Field of Search .............................. 370/352, 353, 370/354, 355, 356, 401, 392, 475, 201, 237, 391, 389; 709/229, 238; 455/415, 401

(56) References Cited

U.S. PATENT DOCUMENTS

| | | | |
|---|---|---|---|
| 5,452,289 A | 9/1995 | Sharma et al. | 370/32.1 |
| 5,471,470 A | 11/1995 | Sharma et al. | 370/81 |
| 5,600,649 A | 2/1997 | Sharma et al. | 370/435 |
| 5,764,627 A | 6/1998 | Sharma et al. | 370/271 |
| 5,862,339 A * | 1/1999 | Bonnaure et al. | 709/227 |
| 6,032,192 A * | 2/2000 | Wegner et al. | 709/238 |
| 6,104,701 A * | 8/2000 | Avargues et al. | 370/238 |
| 6,134,589 A * | 10/2000 | Hultgren | 709/227 |
| 6,185,184 B1 * | 2/2001 | Mattaway et al. | 370/230 |
| 6,347,085 B2 * | 2/2002 | Kelly | 370/352 |
| 6,594,254 B1 * | 7/2003 | Kelly | 370/352 |
| 6,597,687 B1 * | 7/2003 | Rao | 370/352 |
| 6,600,737 B1 * | 7/2003 | Lai et al. | 370/352 |
| 6,600,738 B1 * | 7/2003 | Alperovich et al. | 370/352 |

FOREIGN PATENT DOCUMENTS

| | | |
|---|---|---|
| EP | 0 833 488 A1 | 4/1998 |
| WO | WO 97/29581 | 8/1997 |
| WO | WO 97/31492 | 8/1997 |
| WO | WO 98/47298 | 10/1998 |
| WO | WO 99/14931 | 3/1999 |

\* cited by examiner

*Primary Examiner*—Douglas Olms
*Assistant Examiner*—Ricardo M. Pizarro
(74) *Attorney, Agent, or Firm*—Fenwick & West LLP

(57) ABSTRACT

A system and method for establishing a communication link between an internet telephony device and a PSTN telephone during a user registration period comprises receiving data from a user indicating a plurality of frequently called countries, accessing a gateway provider table comprising data on a plurality of gateway providers that provide service to the plurality of frequently called countries, determining the lowest cost gateway provider for the plurality of frequently called countries, and displaying to the user information on the lowest cost gateway provider for the plurality of frequently called countries. A system and method for dynamically selecting during a PC-to-Phone call connection procedure a destination gateway provider for establishing a connection between an internet telephony device and a PSTN telephone comprises receiving from a user a destination PSTN phone number, selecting the lowest cost destination gateway provider from a gateway provider database using the destination PSTN phone number; and displaying to the user information on the lowest cost destination gateway provider.

18 Claims, 5 Drawing Sheets

PC-TO-PHONE FOR LEAST COST ROUTING WITH USER PREFERENCES

This application claims the benefit of Provisional Application No. 60/119,760, filed Feb. 11, 1999.

BACKGROUND

1. Field of Invention

The present invention relates generally to communication systems, and more particularly, to a method and system for establishing a communication link between an internet telephony device and a PSTN telephone over a network.

2. Background of the Invention

Internet telephony devices are known in the art for providing voice communication over a network, such as the internet. Internet telephony devices work by using a combination of networks that comprise a use internet connection rather than a telecommunications network provided by a local or long distance company. To use an internet telephony device, a user speaks into a personal computer (PC) equipped with a microphone, speaker, and a sound card. On the internet, the voice traffic is treated as a particular kind of data. The voice traffic, converted into bit form, is transmitted as data packets under the existing Internet protocol suites, such as Transmission Control Protocol/Internet Protocol (TCP/IP), that facilitate the reliable exchange of data between computers over the Internet. Essentially, the TCP/IP protocol suites manage the assembly and reassembly of data into data packets that are transmitted and received across the Internet.

Internet telephony devices may also be used to call a PSTN telephone. To establish a communication link between an internet telephony device and a PSTN telephone it is necessary to use an internet gateway provider close to the destination PSTN telephone that can dial the destination PSTN telephone and translate the digital signals from the internet into audio signals for the PSTN telephone. An internet gateway provider is a computer system or network that typically provide communication for PSTN telephone-to-PSTN telephone (hereinafter "phone-to-phone") communications over the internet, but may also be available for providing communications between an internet telephony device and a PSTN telephone (hereinafter "PC-to-phone").

Internet gateway providers are typically deployed in cities around the world to provide phone-to-phone and PC-to-Phone communication. An individual gateway provider company may serve several cities or blanket a large section of the globe depending on the gateway provider. For example, MCI and Sprint are examples of gateway provider companies which serve several cities. In some cities, several gateway providers may serve a particular PSTN telephone. Some of these gateway providers are not compatible with each other.

To reach as many people as possible, it is desirable to have a PC-to-Phone communication service that is compatible (in technology and billing systems) with various gateway provider networks. It is also desirable to have a PC-to-Phone communication system which can automatically compare the costs of service for various gateway providers for providing communication between an internet telephony device and a PSTN telephone and select the destination gateway provider that offers the lowest cost for providing the PC-to-Phone call. In another aspect, it is also desirable to have a PC-to-Phone communication system which can dynamically select a destination gateway provider based on parameters, such as quality specified by a user.

SUMMARY OF THE INVENTION

The limitations in the prior art are overcome by a system and method for establishing a communication link between an internet telephony device and a PSTN telephone via a destination gateway provider which satisfies cost and/or calling parameters specified by the user. In one aspect, the present invention may select a lowest cost destination gateway provider during the user's registration with the PC-to-Phone communication service. The present invention selects the lowest cost destination gateway provider based on a number of frequently called countries specified by the user during the registration process. In another aspect, the present invention dynamically selects a destination gateway provider during the PC-to-Phone call connection process based on parameters specified by the user. If there are no available gateway providers which satisfy the parameters specified by the user, then the user may select a ringback option which informs the user at a later time when a PC-to-Phone call satisfying the user's specified parameters can be made.

A method for selecting during a user registration period a lowest cost destination gateway provider for establishing a connection between an internet telephony device and a PSTN telephone comprises receiving data from a user indicating a plurality of frequently called countries, accessing a gateway provider database storing data on a plurality of gateway providers that provide service to the plurality of frequently called countries, determining the lowest cost destination gateway provider for the plurality of frequently called countries, and displaying to the user information on the lowest cost destination gateway provider for the plurality of frequently called countries.

A method for dynamically selecting during a PC-to-Phone call connection process a destination gateway provider for establishing a connection between an internet telephony device and a PSTN telephone comprises receiving from a user a destination PSTN phone number, selecting a lowest cost destination gateway provider from a gateway provider database using the destination PSTN phone number; and displaying to the user information on the lowest cost destination gateway provider.

DETAILED DESCRIPTION OF PREFERRED EMBODIMENTS

Figure 1:
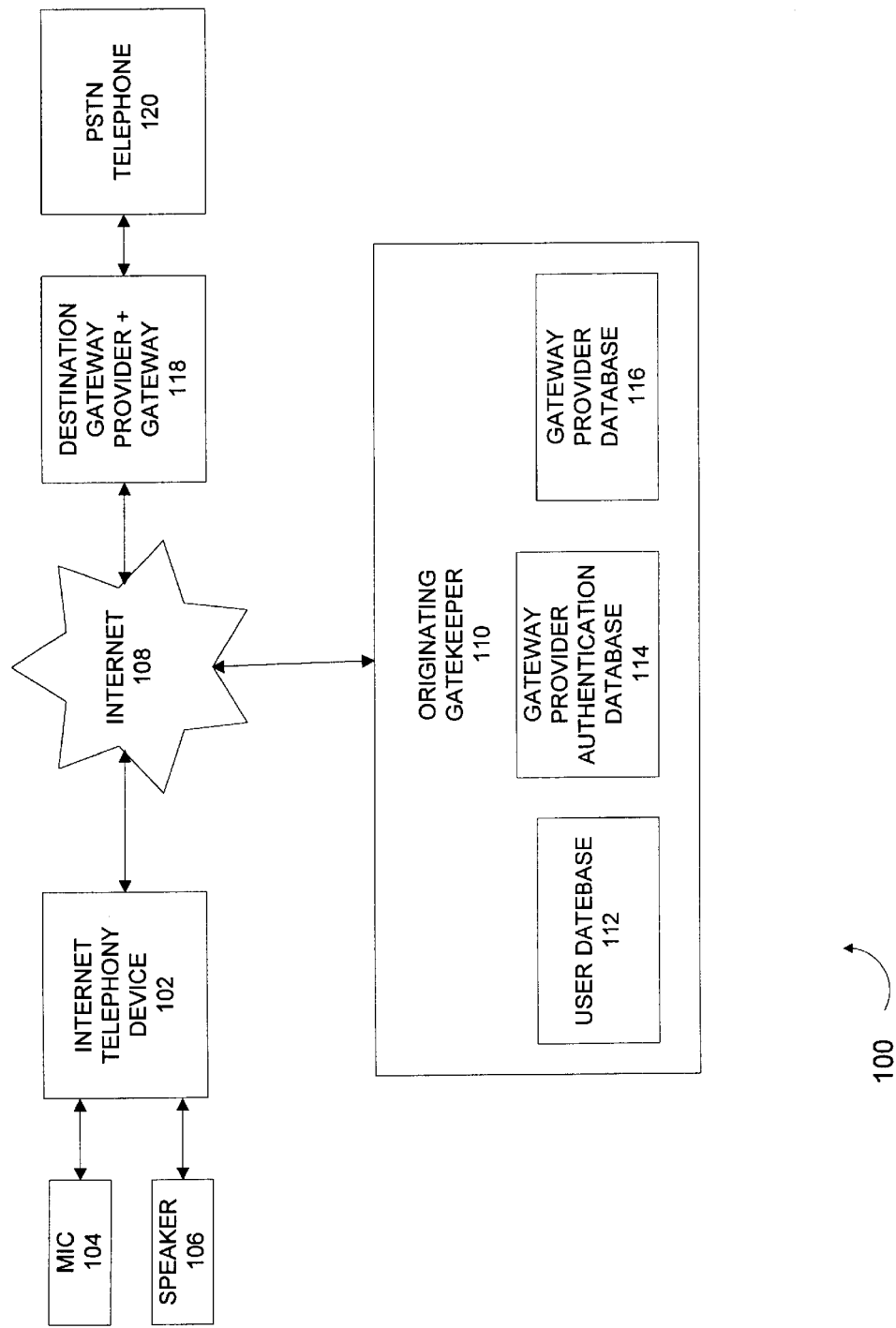
FIG. 1 is a block diagram of a communication system in accordance with the present invention.

Referring to FIG. 1, there is shown a block diagram of a communication system 100 embodying the principles of the present invention. The present invention comprises an internet telephony device 102 which is communicatively coupled to an originating gatekeeper 110, a destination gateway provider and gateway 118 and a PSTN telephone 120. The internet telephony device 102 is an internet telephone voice application and is preferably MediaRing Talk by MediaCom in Singapore which can be downloaded over the internet from www.mediaring.com. The internet telephone voice application may run on any computer system and allows communication between the internet telephony device 102 and another internet telephony device or a PSTN telephone. The internet telephony device 102 preferably includes a microphone 104 and speaker 106 for communicating. The internet 108 may be any computer network which allows communication between computer systems and networks.

The originating gatekeeper 110 may be any general purpose digital computer which serves as an internet gateway and preferably includes a user database 112 for keeping track of individual users registered with the originating gatekeeper 110, a gateway provider authentication database 114 for storing verification and authentication information for users and selected gateway providers, and a gateway provider database 116 for storing information on various destination gateway providers 118. Destination gateway provider and gateway 118 is an internet gateway for providing a communication link between the internet telephony device 102 and the standard PSTN telephone 120.

The gateway provider database 116 preferably keeps track of various gateway provider companies 118 that provide service to destination PSTN telephones. Such information may include the rates of the gateway provider, any restrictions on time of day, the quality of service, and other general information that may be necessary or helpful in locating a gateway provider that satisfies any criteria specified by a particular user. The gateway provider database 116 may also by dynamically updated to contain only the most current information on the gateway providers 118. This may be accomplished by having the various gateway providers 118 provide the information directly to the originating gatekeeper 110 or by having the originating gatekeeper 110 query the various gateway providers 118 and using the responses to update the gateway provider database 116.

Figure 2:
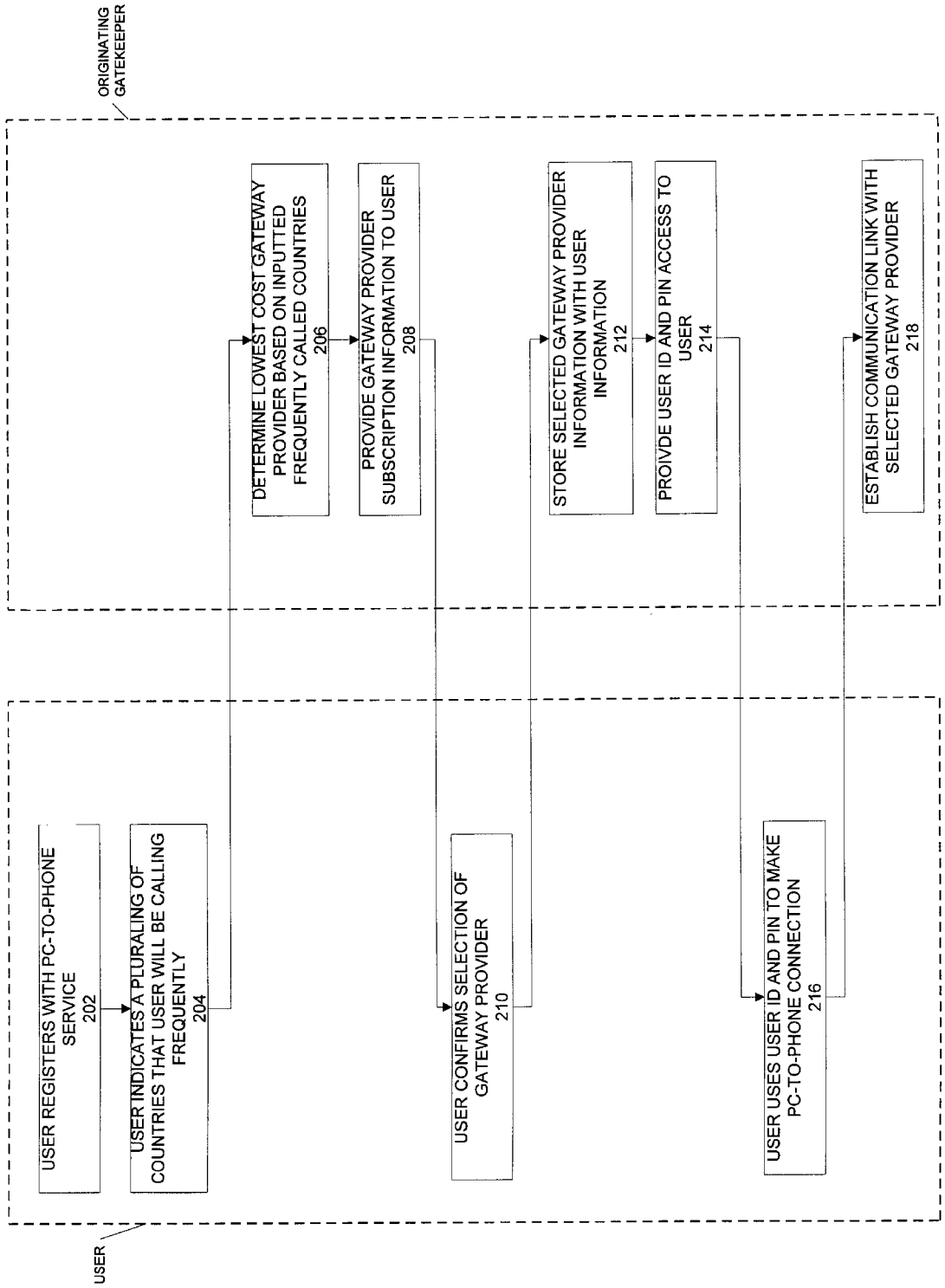
FIG. 2 is a flow chart of one embodiment of a method in accordance with the present invention.

Referring now to FIG. 2, there is shown a flow chart of one embodiment of a method in accordance with the present invention. In accordance with the present invention, a user accesses the originating gatekeeper 110 and the PC-to-Phone communication service using any commercial browser, such as Netscape Navigator by Netscape Communications in Mountain View, Calif., in conventional manner. The user may then register (202) with the originating gatekeeper 110 and subscribe to the PC-to-Phone communication service by inputting answers to questions listed on the web page sent by the originating gatekeeper 110. For example, the user may be required to enter his or her name, address, and telephone number. The user will also be required to indicate (204) a number of countries, for example 3 to 5 countries, that he or she intends to call frequently. For example, the user may indicate that the USA, UK, and China are the countries that the user most frequently calls. In another embodiment of the present invention, the user also may be required to indicate an approximate percentage of time each country will be called. For example, the user may indicate that 50% of the time, calls are made to the USA, 20% of the time, calls are made to the UK, and 30% of the time, calls are made to China.

The originating gatekeeper 110 then uses the information received from the user to determine (206) the lowest cost destination gateway provider for serving the countries chosen. In other words, the originating gatekeeper 110 evaluates the entries in the gateway provider database 116 and retrieves the rates of all the gateway providers that provider service to the most frequently called countries. The originating gatekeeper 110 determines the lowest cost destination gateway provider preferably by computing an average cost for the most frequently called countries. The gateway provider having the lowest average rate for the most frequently called countries indicated by the user will be selected by the originating gatekeeper 110. If the user also indicated the percentage of calls made to each country, matching weighting is assigned to the rate computation.

After the originating gatekeeper 110 has selected the destination gateway provider 118 with the lowest average rate for the most frequently called countries, the browser window will display (208) to the user web pages providing information on the selected destination gateway provider 118. For example, the browser may display the name of the selected destination gateway provider, the rates for the various countries, and general subscription information for the PC-to-Phone communication service.

The user may then be required to confirm (210) selection of the selected destination gateway provider 118 for providing PC-to-Phone communication service. The user may be required to confirm selection of the gateway provider and PC-to-Phone service. For example, the user may be required to input billing information such as a credit card number. Once the user has confirmed selection of the selected destination gateway provider, the user registration information and the selected gateway provider information is stored (212) in user database 112 and/or gateway provider authentication database 114. Typically, the user is then provided (214) with a user identification (user ID) and a password (PIN) for accessing and using the PC-to-Phone communication service. The user ID and PIN may be sent to the user via email or they may be incorporated into the user's PC software to automatically enable PC-to-Phone communication as would be known to those skilled in the art.

The user then enters the user ID and PIN into the internet telephony device 102 to make a PC-to-Phone call. The originating gatekeeper 110 verifies the user ID and PIN using the gateway provider authentication database 114. After the user ID and PIN have been verified, the originating gatekeeper 110 will establish (218) a communication link to the destination PSTN phone number 120 using the selected destination gateway provider 118. The selected destination gateway provider 118 will then become the default gateway provider for all subsequent PC-to-Phone communications made by the user.

One advantage of the present invention is the selection of a lowest cost destination gateway provider during the user's registration with the originating gatekeeper. By simply having the user enter the countries he or she most frequently calls, the present invention selects the destination gateway provider which will provide the lowest cost for establishing a communication link between the internet telephony device and the PSTN telephone. The selected destination gateway provider will then be used as the default gateway provider for all PC-to-Phone communications.

Figure 3A:
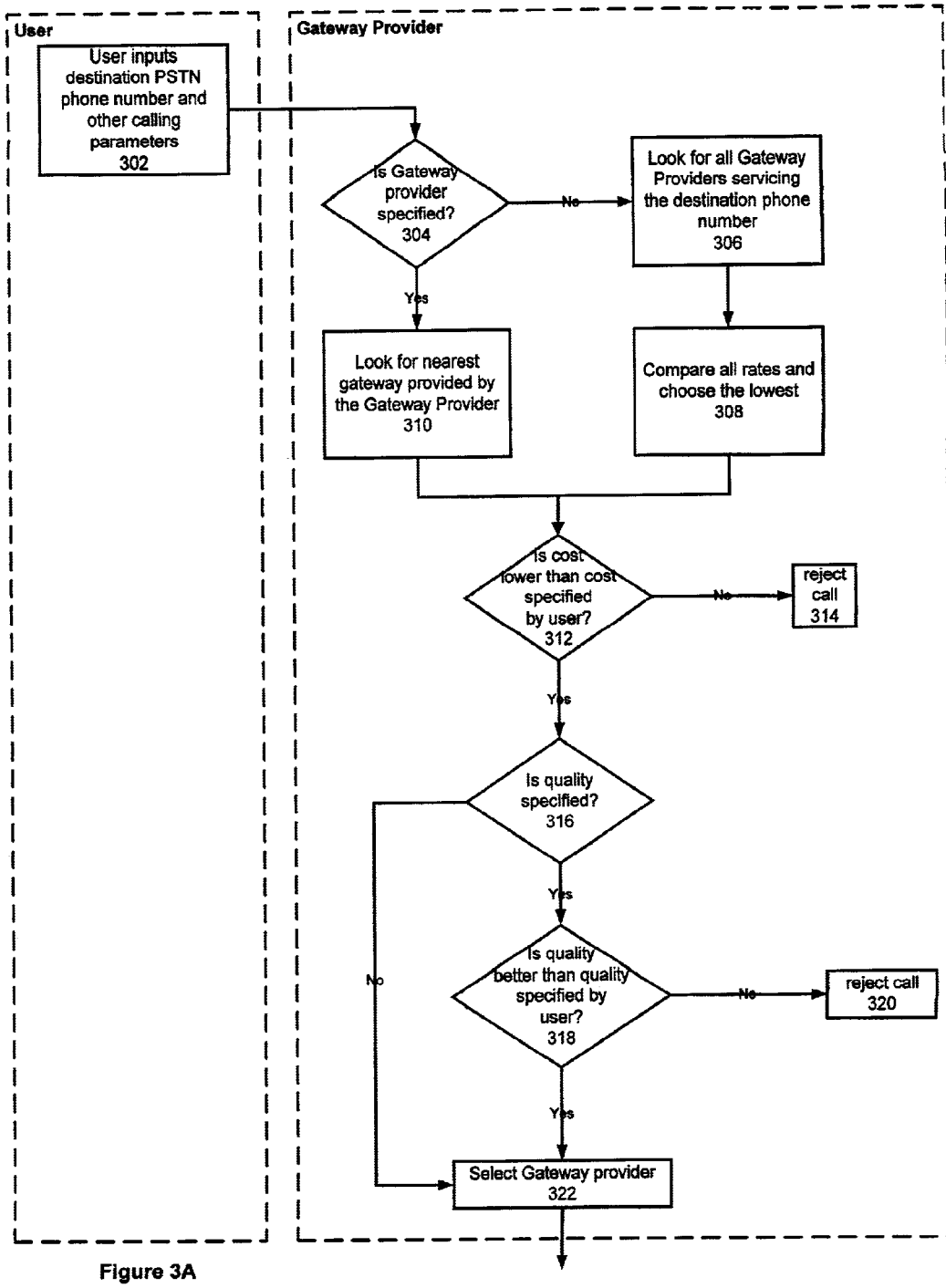
FIGS. 3A and 3B are flow charts of another embodiment of a method in accordance with the present invention.
Figure 3B:
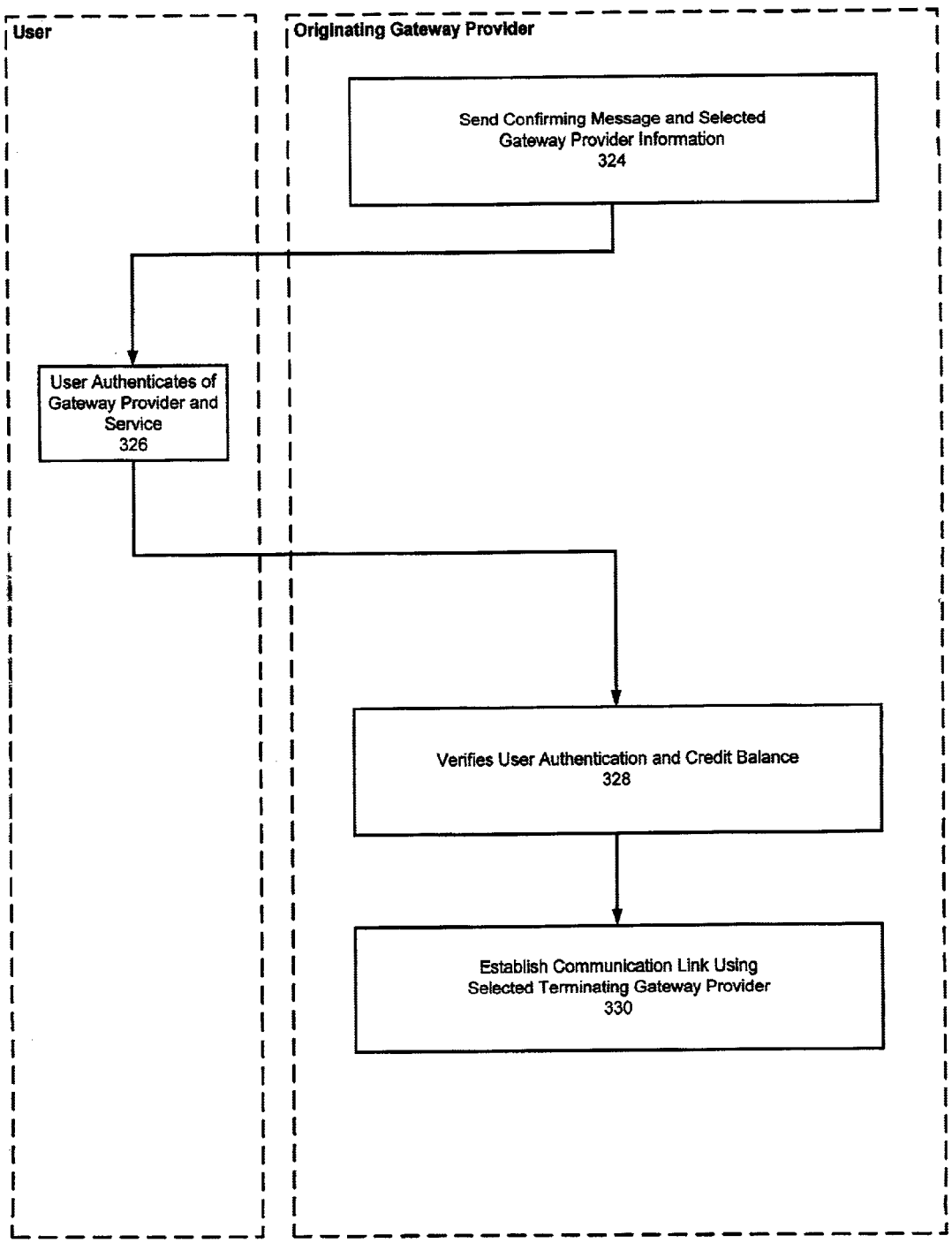

Referring now to FIGS. 3A and 3B, there are shown flow charts of another embodiment of the present invention. In accordance with the present invention, to make a PC-to-Phone call, the user inputs (302) the destination PSTN phone number into the internet telephony device 102. The user may also input additional parameters for the PC-to-Phone communication such as the highest cost allowed, the quality of service desired, or the preferred gateway provider or rate plan. The internet telephony device then sends, in conventional manner, a message to the originating gatekeeper containing this information. The originating gatekeeper 110 then uses the information received from the user to evaluate the entries in the gateway provider database 116 and retrieves the rates of all the gateway providers serving the destination PSTN telephone number. The destination gateway provider 118 is then selected based on the cost and other parameters indicated by the user. The originating gatekeeper 110 determines (304) whether a rate plan or gateway provider was specified by the user. If a rate plan or gateway provider was specified, the originating gatekeeper 110 will search for the nearest gateway provided by the gateway provider that serves the destination PSTN telephone number. In one embodiment, if the cost of the specified gateway provider is higher than the cost specified by the user, then the call may be rejected. If the call is rejected, the originating gatekeeper may send a message to the user indicating the cost of the specified gateway provider is higher than the cost specified by the user and allow the user to alter either the selected rate plan or gateway provider or the highest cost allowed.

If no particular rate plan or gateway provider is specified, the originating gatekeeper 110 will search for all gateway providers that serve the destination PSTN telephone 120. The originating gatekeeper 110 will then compare (308) the cost of the various gateway providers for the destination PSTN telephone 120 and will select the gateway provider with the lowest cost. In one embodiment, if the cost of the selected gateway provider is higher than the highest cost allowed specified by the user, then the call may be rejected. If the call is rejected, the originating gatekeeper may send a message to the user indicating that the lowest cost of all available gateway providers is higher than the highest cost allowed as specified by the user and allow the user to alter the highest cost allowed.

If the quality of service is also specified by the user, the originating gatekeeper determines whether the selected destination gateway provider meets the quality specified by the user. If the quality is not acceptable, the call may be rejected. The originating gatekeeper 110 may then send a message to the user indicating that the quality selected by the user is not possible and may allow the user to alter the desired quality. In general, the quality of a PC-to-Phone call may be measured by audio delay and/or distortion introduced by the gateway provider. Such data may be collected through real-time measurement during the call or retrieved from historical statistics as would be well known to one skilled in the art.

After selecting the destination gateway provider 118, the originating gatekeeper 110 sends a message to the user through the internet telephony device 102 confirming (324) the selection of a destination gateway provider 118 satisfying the parameters specified by the user. The originating gatekeeper 110 may also indicate the selected destination gateway provider 118. The internet telephony device 102 may then prompt the user to enter his or her password or PIN to verify (328) the user's registration information and use of the selected destination gateway provider. The originating gatekeeper 110 may also verify the credit balance of the user using a credit balance database (not shown). After the use's ID and Pin and credit balance have been verified, the originating gatekeeper 110 will establish a PC-to-Phone communication link with the destination PSTN telephone number using the selected destination gateway provider 118. Preferably, this is accomplished by the originating gatekeeper 110 sending an appropriate message to the selected destination gateway provider 118 for establishing a PC-to-Phone communication link. The destination gateway provider 118 will make a PSTN phone call to the destination telephone 120 in conventional manner. When the PSTN telephone 120 is answered, the destination gateway provider 118 may send a confirmation message to the originating gatekeeper 110 which in turn sends a confirmation message to the internet telephony device 102. Accordingly, the present invention establishes a voice connection between the internet telephony device 102 and the destination PSTN telephone 120.

One advantage of the present invention is the dynamic selection of a destination gateway provider during the call connection process. In other words, each time the user makes a PC-to-Phone call, the present invention selects the destination gateway provider based on the parameters inputted by the user. Thus, the present invention can dynamically select a destination gateway provider for a PC-to-Phone call which satisfies the user's calling parameters.

Another advantage of the present invention is the selection of a destination gateway provider during the user's registration based on parameters other than cost. When the user registers with the originating gatekeeper, the user can indicate parameters, such as quality, for selecting the destination gateway provider for communications between an internet telephony device and a PSTN telephone. The present invention then selects the destination gateway provider which satisfies the user's selection parameters.

Figure 4:
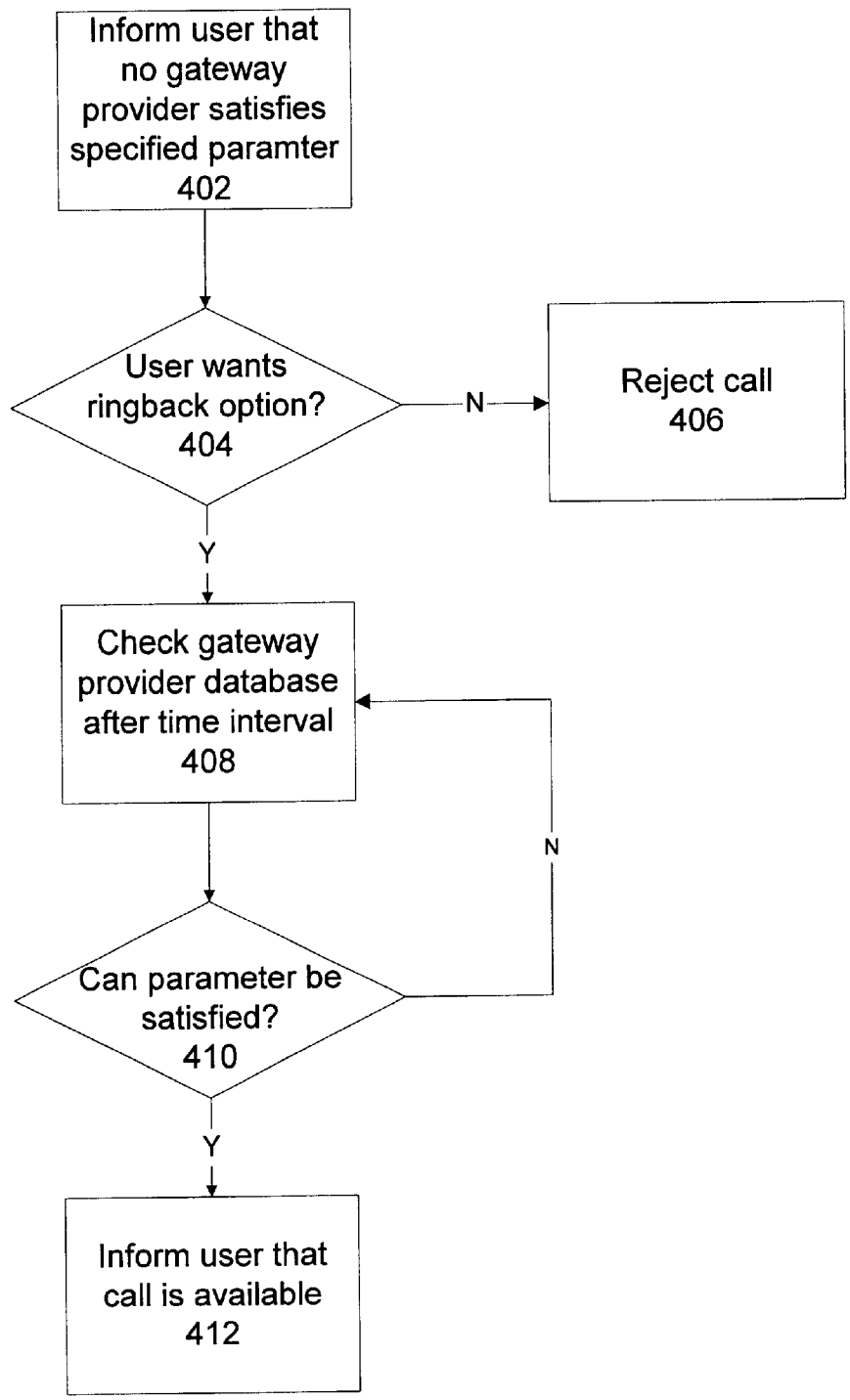
FIG. 4 is a flow chart of another embodiment of a method in accordance with the present invention.

Referring now to FIG. 4, there is shown a flow chart for another embodiment of the present invention. As discussed above, in one embodiment of the present invention, if there are no available gateway providers which satisfy a parameter inputted by a user, the present invention may allow the user to change that parameter and select a ring-back option. For example, if the user inputted a maximum cost, and the originating gatekeeper 110 determines that no available destination gateway provider offers a cost lower than the maximum cost, then the originating gatekeeper 110 may send (402) a message to the user indicating that the call is rejected. The originating gatekeeper may then determine (404) whether the user would like to select the ringback option. The ringback option allows the user to request the originating gatekeeper 110 to defer the PC-to-Phone call until the rate is equal to or below the rate specified by the user. If the user does not select the ringback option, then the call is rejected (406). If the user selects the ringback option, then the originating gatekeeper 110 will check (408) at certain time intervals, e.g. every 2 minutes, whether the cost of any gateway provider is equal to or lower than the highest cost specified by the user. In another embodiment, the user may also specify the duration of time that the user is willing to wait while the originating gatekeeper 110 determines whether a gateway provider satisfies the user's specified cost. If the originating gatekeeper 110 finds a gateway provider which can satisfy the user's specified cost, then the originating gatekeeper 110 informs (412) the user by calling the internet telephony device 102. The user may then accept the call and proceed with a PC-to-Phone call which satisfies the user's original requested parameters.

From the above description, it will be apparent that the invention disclosed herein provides a novel and advantageous system and method for establishing a communication link between an internet telephony device and a PSTN telephone. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method for selecting during a user registration period a least cost gateway provider for establishing a connection between an internet telephony device and a non-internet telephony device via the least cost gateway provider, the method comprising:

receiving data from a user indicating a plurality of frequently called countries and parameter data including a frequency percentage assigned by the user to at least one of the plurality of frequently called countries;

accessing a gateway provider database comprising data on a plurality of gateway providers that provide service to the plurality of frequently called countries;

determining the lowest cost gateway provider for the plurality of frequently called countries using the parameter data; and displaying to the user information on the lowest cost gateway provider for the plurality of frequently called countries selecting the lease cost gateway provider from a least cost routing table using the parameter data.

2. The method of claim 1 further comprising the step of:
receiving confirmation front the user to select the lowest cost gateway provider for establishing a connection between an internet telephony device and a non-internet telephony device.

3. The method of claim 1 further comprising the step of:
storing in a user data table the lowest cost gateway provider and user identification information.

4. A method for dynamically selecting during a call connection procedure a least cost destination gateway provider for establishing a connection between an internet telephony device and a non-internet telephony device via an originating gatekeeper and the least cost destination gateway provider, the originating gatekeeper having a least cost routing table, the method comprising:

receiving from a user a destination PSTN phone number;
receiving parameter data from the user;
sending a message to the originating gatekeeper, the message including the destination PSTN phone number;
selecting the least cost destination gateway provider from the least cost routing table using the destination PSTN phone number and the parameter data; and
displaying to the user information on the least cost destination gateway provider.

5. The method of claim 4 wherein the parameter data indicates a destination gateway provider.

6. The method of claim 4 wherein the parameter data indicates a maximum cost.

7. The method of claim 4 wherein the parameter data indicates a quality of service.

8. The method of claim 4 further comprising the step of:
receiving confirmation from the user to use the least cost destination gateway provider for establishing a connection between the internet telephony device and the non-internet telephony device.

9. A method for dynamically selecting during a call connection procedure a least cost destination gateway provider for establishing a connection between an internet telephony device and a non-internet telephony device via an originating gatekeeper and the least cost destination gateway provider, the originating gatekeeper having a least cost routing table, the method comprising:

receiving from a user a destination PSTN phone number;
sending a message to the originating gatekeeper, the message including the destination PSTN phone number;
selecting the least cost destination gateway provider from the least cost routing table using the destination PSTN phone number;

displaying to the user information on the least cost destination gateway provider;
receiving confirmation from the user to use the least cost destination gateway provider for establishing a connection between the internet telephony device and the non-internet telephony device; and
using the confirmation from the user to verify a credit balance for the user.

10. A method for dynamically selecting during a call connection procedure a destination gateway provider for establishing a connection between an internet telephony device and a non-internet telephony device via an originating gatekeeper and the destination gateway provider, the originating gatekeeper having a least cost routing table, the method comprising:

receiving from a user a destination PSTN phone number and parameter data;
determining whether a destination gateway provider from the least cost routing table satisfies the parameter data for the destination PSTN phone number;
displaying to the user information indicating that a connection cannot be established using the parameter data for the destination PSTN phone number; and
sending a message to the user at a later time indicating that a destination gateway provider can satisfy the parameter data for the destination PSTN phone number.

11. The method of claim 10 further comprising the steps of:
receiving from the user new parameter data; and
determining a destination gateway provider from the least cost routing table using the new parameter data and the destination PSTN phone number.

12. A computer program product, for a computer system including a processor and a memory, for selecting during a user registration period a least cost gateway provider for establishing a connection between an internet telephony device and a non-internet telephony device via the least cost gateway provider, the computer program product comprising:

a computer readable storage medium comprising;
code that directs the processor to receive parameter data from a user indicating a plurality of frequently called countries and a frequency percentage assigned by the user to at least one of the plurality of frequently called countries;
code that directs the processor to access a gateway provider table comprising data on a plurality of gateway providers that provide service to the plurality of frequently called countries;
code that directs the processor to determine the least cost gateway provider for the plurality of frequently called countries using the parameter data; and
code that directs the processor to display to the user subscription information on the least cost gateway provider for the plurality of frequently called countries selecting the least cost gateway provider from a least cost routing table using the parameter data.

13. The computer program product of claim 12 further comprising:
code that directs the processor to receive confirmation from the user to select the least cost gateway provider for establishing a connection between an internet telephony device and a non-internet telephony device.

14. The computer program product of claim 12 further comprising:

code that directs the processor to store in a user data table the least cost gateway provider and user identification information.

15. A computer program product, for a computer system including a processor and a memory, for dynamically selecting during a call connection procedure a least cost gateway provider for establishing a connection between an internet telephony device and a non-internet telephony device via an originating gatekeeper and a destination gateway provider, the originating gatekeeper having a least cost routing table, the computer program product comprising:

a computer readable storage medium comprising:
code that directs the processor to receive from a user a destination PSTN phone number;
code that directs the processor to receive from a user parameter data;
code tat directs the processor to send a message to the originating gatekeeper, the message including the destination PSTN phone number;
code that directs the processor to select a least cost destination gateway provider from the least cost routing table using the destination PSTN phone number and the parameter data; and
code that directs the processor to display to the user information on the least cost destination gateway provider.

16. The computer program product of claim 15 further comprising:

code that directs the processor to receive confirmation from the user to use the least cost destination gateway provider for establishing a connection between the internet telephony device and the non-internet telephony device.

17. A computer program product, for a computer system including a processor and a memory, for dynamically selecting during a call connection procedure a destination gateway provider for establishing a connection between an internet telephony device and a non-internet telephony device via an originating gatekeeper and the destination gateway provider, the originating gatekeeper having a least cost routing table, the computer program product comprising:

a computer readable storage medium comprising:
code that directs the processor to receive from a user a destination PSTN phone number and parameter data;
code that directs the processor to determine whether a destination gateway provider from the least cost routing table satisfies the parameter data for the destination PSTN phone number; and
code that directs the processor to display to the user information indicating that a connection cannot be established using the parameter data for the destination PSTN phone number; and
code that directs the processor to send a message to the user at a later time indicating that a destination gateway provider can satisfy the parameter data for the destination PSTN phone number.

18. The computer program product of claim 17 further comprising:

code that directs the processor to receive from the user new parameter data; and
code that directs the processor to determine a destination gateway provider from the least cost routing table using the new parameter data and the destination PSTN phone number.

\* \* \* \* \*

UNITED STATES PATENT AND TRADEMARK OFFICE
CERTIFICATE OF CORRECTION

| | |
|---|---|
| PATENT NO. | : 6,791,970 B1 |
| APPLICATION NO. | : 09/398319 |
| DATED | : September 14, 2004 |
| INVENTOR(S) | : Ede-Phang Ng et al. |

It is certified that error appears in the above-identified patent and that said Letters Patent is hereby corrected as shown below:

Column 7, line 15, please replace "lease" with --least--.

Column 7, line 18, please replace "front" with --from--.

Column 9, line 19, please replace "tat" with --that--.

Signed and Sealed this

Twenty-fifth Day of July, 2006

JON W. DUDAS
*Director of the United States Patent and Trademark Office*